United States Patent [19]

Jennison

[11] Patent Number: 5,715,711
[45] Date of Patent: Feb. 10, 1998

[54] PORTABLE WHEEL IMMOBILIZING DEVICE

[76] Inventor: Thomas Jennison, 218 Tech Rd., Pittsburgh, Pa. 15205

[21] Appl. No.: 598,654

[22] Filed: Feb. 8, 1996

[51] Int. Cl.$^6$ .................................................. B60R 25/00
[52] U.S. Cl. ................................. 70/226; 70/14; 70/237; 188/32
[58] Field of Search ..................... 70/209–212, 225, 70/226, 237, 238, 14, 18, 19, 259, 233; 188/32

[56] References Cited

U.S. PATENT DOCUMENTS

| | | | |
|---|---|---|---|
| 1,396,067 | 11/1921 | Setkowski | 70/225 |
| 2,577,330 | 12/1951 | Johnston . | |
| 2,818,265 | 12/1957 | Calderwood . | |
| 3,537,548 | 11/1970 | Jeppeson | 70/225 X |
| 3,828,590 | 8/1974 | Thiebault . | |
| 3,845,643 | 11/1974 | Barrett | 70/226 X |
| 3,907,072 | 9/1975 | Shafer . | |
| 4,034,824 | 7/1977 | Lucas | 70/226 X |
| 4,164,131 | 8/1979 | Desmond et al. . | |
| 4,441,586 | 4/1984 | Bernier . | |
| 4,574,602 | 3/1986 | Furuse . | |
| 4,649,724 | 3/1987 | Raine | 70/237 X |
| 4,651,849 | 3/1987 | Givati . | |
| 4,768,359 | 9/1988 | Wade . | |
| 4,833,442 | 5/1989 | Von Heck . | |
| 4,854,144 | 8/1989 | Davis . | |
| 4,913,265 | 4/1990 | Richards | 70/226 X |
| 4,977,974 | 12/1990 | Brown . | |
| 5,133,201 | 7/1992 | Lamott et al. . | |
| 5,176,013 | 1/1993 | Kutauskas | 70/226 X |
| 5,214,944 | 6/1993 | Wolthoff | 70/226 |
| 5,222,785 | 6/1993 | Green . | |
| 5,247,815 | 9/1993 | Caldwell . | |
| 5,301,527 | 4/1994 | Pollard | 70/226 |
| 5,333,477 | 8/1994 | Davis | 70/14 X |
| 5,333,478 | 8/1994 | Chuang | 70/226 X |
| 5,410,897 | 5/1995 | Edmonson | 70/226 |

FOREIGN PATENT DOCUMENTS

| | | | |
|---|---|---|---|
| 3030308 | 4/1982 | Germany | 70/226 |
| 4201653 | 7/1992 | Japan | 70/225 |
| 2110175 | 6/1983 | United Kingdom | 70/226 |
| 2206552 | 1/1989 | United Kingdom | 70/226 |
| 2218953 | 11/1989 | United Kingdom | 70/225 |

*Primary Examiner*—Suzanne Dino
*Attorney, Agent, or Firm*—Titus & McConomy

[57] ABSTRACT

The portable wheel immobilizing device is comprised of two parallel covers which are attached together to angularly rotate in opposite directions about an axis perpendicular to both covers. A pair of parallel arms is attached to each cover. The arm pairs intersect at the aforesaid axis and each arm pair rotates with its cover around the aforesaid axis between a position in which all the arms are parallel to each other to a position in which the arm pairs are angularly disposed to be substantially perpendicular to each other but in which the arms in a pair remain parallel. The arms in a pair are movable in opposite directions between a length in which their combined span is at a minimum to allow compact storage of the device to a length in which their combined span is at a maximum to allow the arms to engage the outside periphery of the wheel to allow the arms to surround the wheel. One arm in each pair has an end shaped to fit around the outside of the wheel while the other arm in the pair has both an end shaped to engage the outside periphery of the wheel and an end designed to act as a chalk to immobilize the wheel upon insertion between the wheel and the ground. The arm pairs are coupled to a rotary member which is coaxial with their axis of rotation and which simultaneously rotates both pairs of arms between their minimum and maximum length.

16 Claims, 4 Drawing Sheets

PORTABLE WHEEL IMMOBILIZING DEVICE

FIELD OF THE INVENTION

The invention relates to a portable anti-theft device for vehicles. Specifically, the invention relates to a portable device for manual attachment to a wheel of a vehicle to mobilize the vehicle.

BACKGROUND OF THE INVENTION

Many inventions have been disclosed for the purpose of deterring vehicle theft, including those which are attached to a wheel to immobilize the vehicle. In general, these devices are similar in construction and operation to the "Denver Boot", a device which is commonly used by municipal police departments to immobilize illegally parked vehicles.

A general disadvantage of prior art "wheel lock" designs is their weight and bulkiness, which prevents them from being installed easily by a single individual. The present invention solves this problem by utilizing a design which weighs less than 30 lbs. that has rotatable, variable length arms which can be compactly configured for easy installation, removal and storage.

Another disadvantage of prior art extending arm "wheel lock" designs is that they are generally not capable of being installed on the front wheel of a vehicle, because the arms interfere with suspension components above the front wheel near its vertical centerline. The present invention solves this problem by providing wheel contact points which are offset from the vertical centerline, permitting installation on either the front or back wheel. In addition, the use of four wheel contact points provides an improved theft deterrent over those designs which contact the wheel at only three points, since it is necessary to disable more than a single arm to remove the device.

Another improvement provided by the present invention over prior art wheel lock disclosures is the dual cover plate construction, which provides a barrier to tampering with wheel lug nuts and the internal components of the device that are all housed between the cover plates. In addition, the recessed design of the locking element into the exterior cover plate is intended to make it impossible to tamper with the lock by using external tooling. Finally, the use of a ratcheted design for tightening the extendable arms of the device allows it to be used on any size wheel.

Accordingly, it is an object of the present invention to provide a wheel immobilizing device of compact, lightweight construction, which is capable of easy installation, removal and storage by a single individual.

It is another object of the present invention to provide a wheel immobilizing device which is capable of being installed on either the front or back wheel of a vehicle, and which has four contact points with the wheel.

It is another object of the present invention to provide a wheel immobilizing device which provides a barrier to removal of the wheel and to tampering with internal locking components.

It is another object of the present invention to provide a ratcheted design for tightening the device around the wheel to allow the device to be used on any size wheel.

It is another object of the present invention to provide a wheel immobilizing device that can be adjusted for installation on any size wheel.

It is another object of the present invention to provide a wheel immobilizing device that can be adjusted for installation on a wheel having minimal fender and ground clearance.

It is another object of the present invention to provide a wheel immobilizing device that is a single self-contained unit that requires no installation of extraneous components.

SUMMARY OF THE INVENTION

The portable wheel immobilizing device is comprised of two parallel covers which are attached together to angularly rotate in opposite directions about an axis perpendicular to both covers. A pair of parallel arms is attached to each cover. The arm pairs intersect at the aforesaid axis and each arm pair rotates with its cover around the aforesaid axis between a position in which all the arms are parallel to each other to a position in which the arm pairs are angularly disposed to be substantially perpendicular to each other but in which the arms in a pair remain parallel.

The arms in a pair are movable in opposite directions between a length in which their combined span is at a minimum to allow compact storage of the device to a length in which their combined span is at a maximum to allow the arms to engage the outside periphery of the wheel to allow the arms to surround the wheel. One arm in each pair has an end shaped to fit around the outside of the wheel while the other arm in the pair has both an end shaped to engage the outside periphery of the wheel and an end designed to act as a chalk to immobilize the wheel upon insertion between the wheel and the ground. The arm pairs are coupled to a rotary member which is coaxial with their axis of rotation and which simultaneously rotates both pairs of arms between their minimum and maximum length. When engaged by a ratchet the rotary member is permitted to rotate only in the direction to withdraw the arms toward their minimum length to tighten around the wheel. The device has a fastener which is engaged to fasten the arms and covers in their angularly disposed position and a lock which simultaneously locks the covers with both arm pairs enclosing the immobilized wheel.

The device is first aligned to the wheel with the arms all substantially parallel to each other and at their minimum length. The arms are then extended to a length to allow the arms to engage the outside periphery of the wheel and the covers are rotated to extend the arms angularly to surround the wheel. The chalking ends of the device are placed between the wheel and the ground on opposite sides of the wheel and the fastener angularly locks the arms into place. The rotary member then withdraws the arms toward their minimum length to enclose the wheel with a ratchet engaged to prevent re-extension of the arms. Either before or after tightening of the arms the device is locked to lock the cover plates in their angularly disposed position and to prevent the ratchet from disengaging to prevent re-extension of the arms thus immobilizing the wheel to prevent theft of the vehicle.

BRIEF DESCRIPTION OF THE DRAWINGS

FIG. (1) is a front view of the preferred embodiment of the portable wheel immobilizing device with arms rotated and extended to enclose a wheel.

FIG. (2) is a front view of the preferred embodiment of the portable wheel immobilizing device with arms folded in their storage position.

Figure 1:
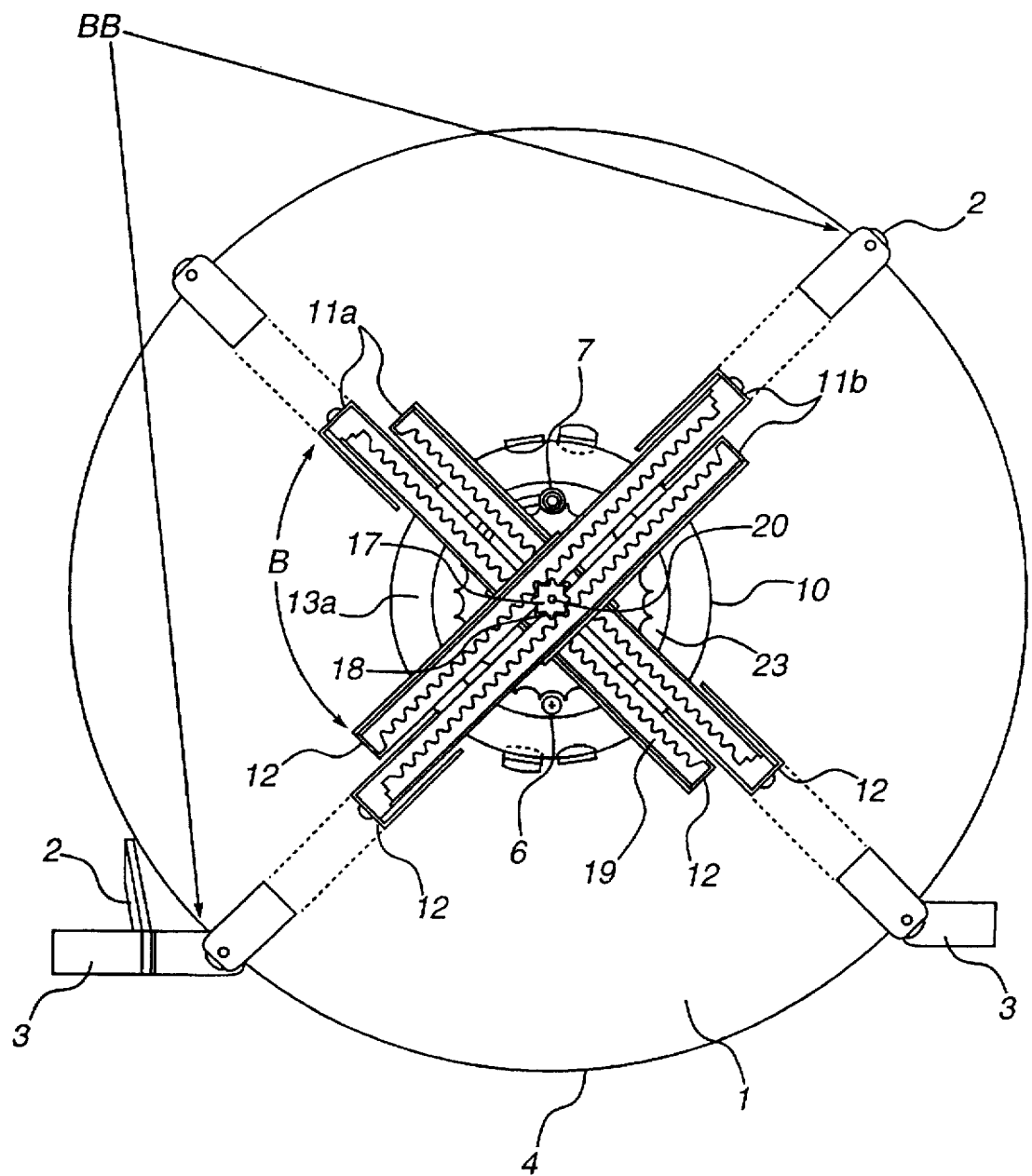
Figure 2:
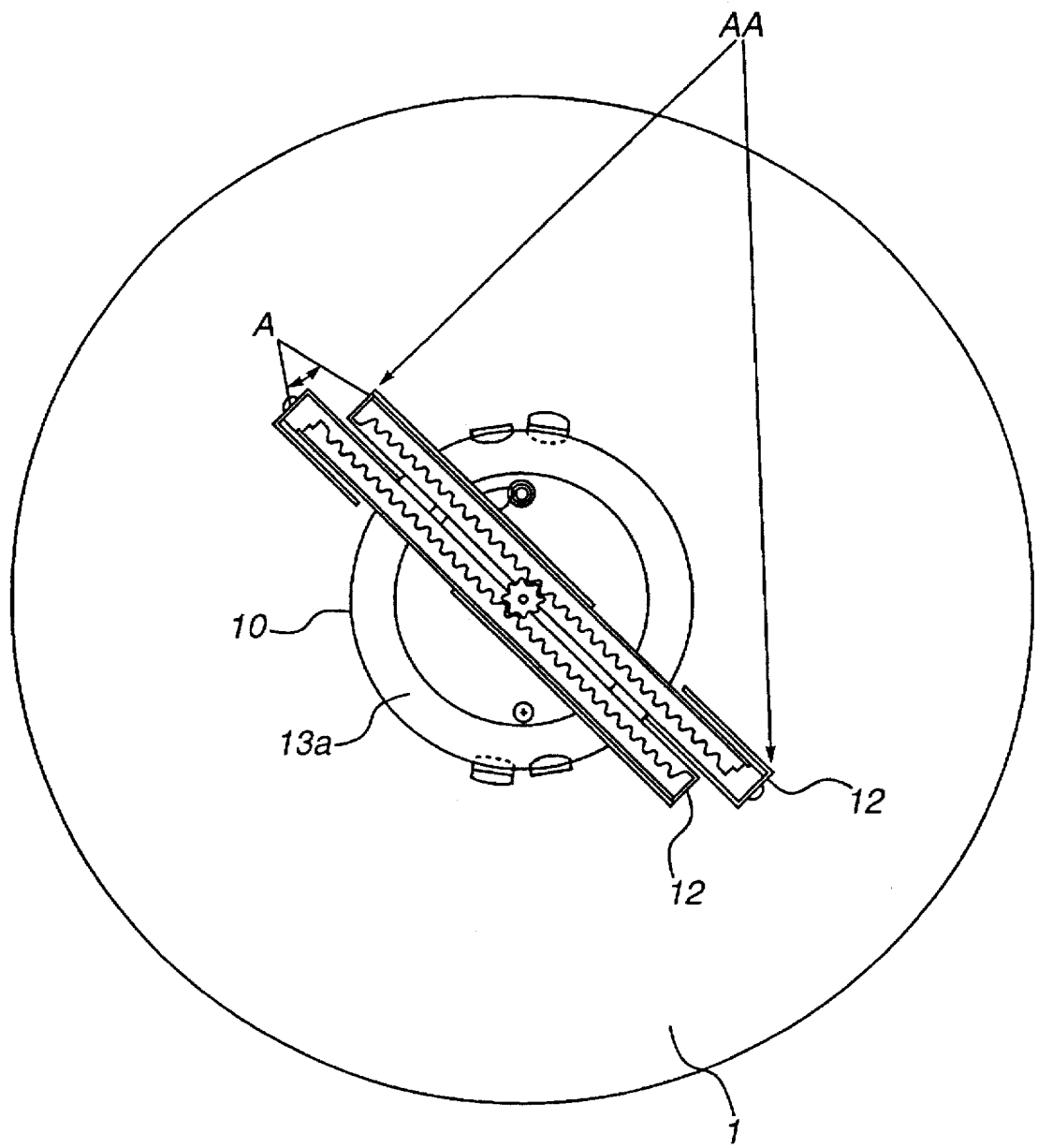
Figure 3:
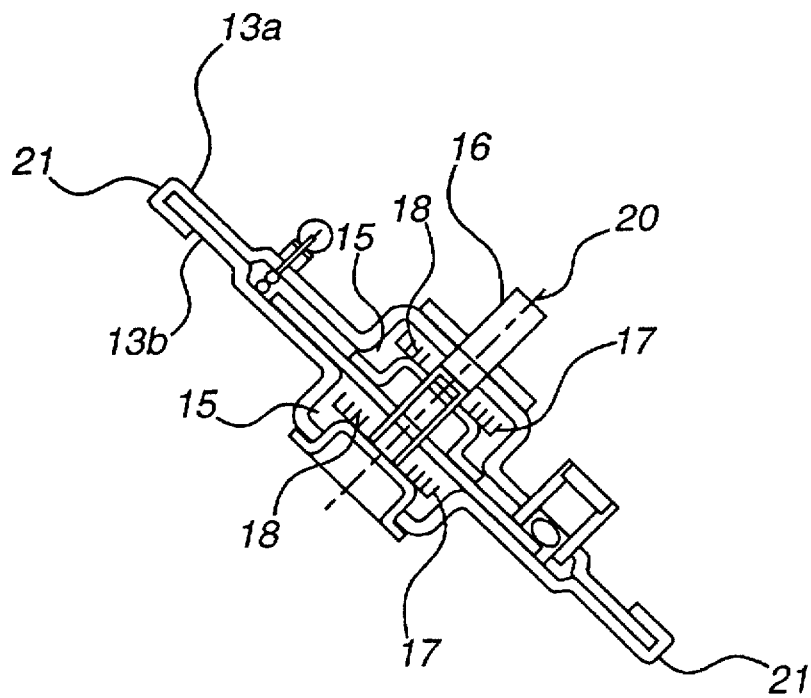
Figure 4:
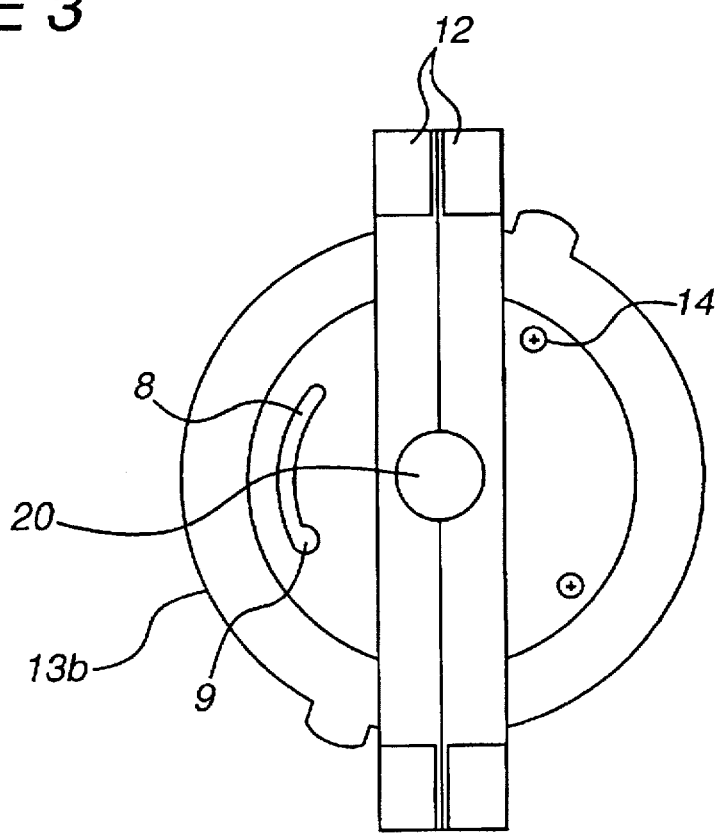
Figure 5:
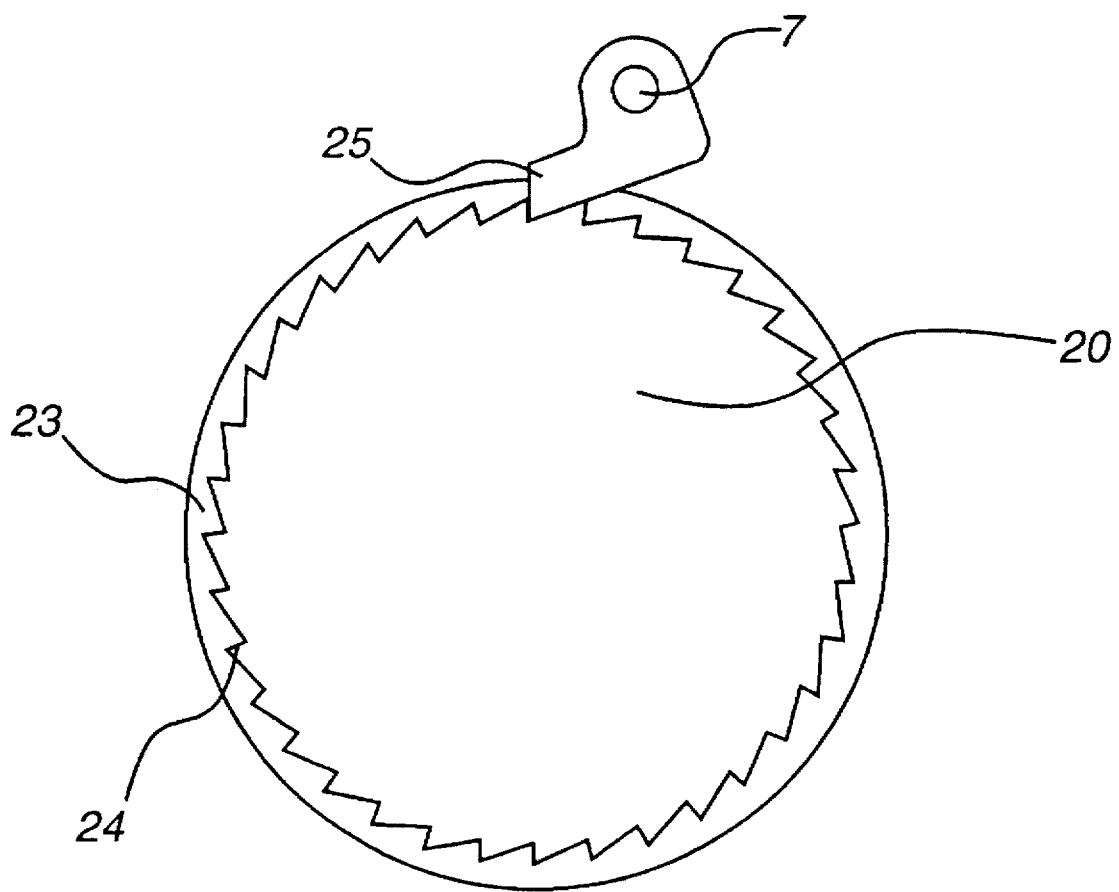

FIG. (3) is a side view of the interior housing formed by attachment of the cover plates in the preferred embodiment.

FIG. (4) is a top view of the cover plate used in the preferred embodiment.

FIG. (5) is a top view of the ratchet used in the preferred embodiment.

DETAILED DESCRIPTION OF THE PREFERRED EMBODIMENT

The parts of the wheel immobilizing device can be constructed of conventional strong lightweight durable metals, such as aluminum, carbon steel, or various synthetic materials such as fiberglass reinforced resins and thermoplastics, or various alloys including American Iron and Steel Institute (AISI) alloys 4140, 4340, and 8620. As configured in the preferred embodiment the device weighs less than 30 lbs.

FIGS. (1) and (2) shows the preferred embodiment of the portable wheel immobilizing device 10 attached to a wheel 1. The wheel immobilizing device 10 has two pairs 11a and 11b, respectively, of parallel arms 12 which enclose the wheel 1. In the preferred embodiment, the arm pairs 11a and 11b are rotatable from a first storage position A shown in FIG. (2) in which the arms 12 are all substantially parallel to one another to a second engaged position B shown in FIG. (1) in which both arms 12 in a pair 11a or 11b remain parallel to each other but in which the arm pairs 11a and 11b are angularly disposed to be substantially perpendicular to each other.

The arms 12 in a pair 11a or 11b are movable in opposite directions from a first length AA shown in FIG. (2) in which their combined span is at a minimum to allow compact storage of the device to a second length BB shown in FIG. (1) in which their combined span is at a maximum to allow the arms 12 to engage the outside periphery of the wheel 1. This rotatable variable length arm design is intended to allow compact storage of the device when the arm pairs 11a and 11b are in their storage position A withdrawn to their minimum length AA and to allow installation with minimal fender and ground clearance.

As shown in FIGS. (3) and (4), each arm pair 11a and 11b is preferably housed inside a separate cover plate 13a and 13b, respectively, to slide inside a section of the hollow cavity 15 formed when the cover plates 13a and 13b are attached together to preferably form circular mirror images of each other. The cover plates 13a and 13b are attached so that the edge of one cover plate slides against the other by preferably circumferentially forming the peripheral edge of one cover plate 13a or 13b to define a rim 21 into which the peripheral edge of the other cover plate 13b or 13a fits. The dual cover plate design presents a barrier to tampering with wheel lug nuts to remove the wheel as well as to tampering with the internal components of the immobilizing device 10 which are all housed within the cavity 15 defined by the covers 13a and 13b.

The cover plates 13a and 13b concentrically rotate parallel to each other in opposite angular directions about a common axis 20. Axis 20 is oriented perpendicular to the planes in which the cover plates 13a and 13b rotate and is the axis of symmetry for the mirror images formed by the mating of the cover plates 13a and 13b. The arm pairs 11a and 11b intersect at axis 20 to rotate in planes perpendicular to axis 20. The rotation of the arm pairs 11a and 11b from their storage position A to their angularly disposed position B is accomplished by the combined rotation of the cover plates 13a and 13b about axis 20 in opposite angular directions with respect to each other.

In the preferred embodiment as shown in FIG. (3), the cavity 15 contains a geared rotary shaft 16. The shaft 16 is preferably coaxial with axis 20. The shaft 16 protrudes from the cavity 15 and is rotatable. Any form of handle can be used to rotate the shaft 16 but the use of either an external "T" handle, or a flat head screwdriver inserted into a groove in the recessed head of the shaft 16 is preferred.

In the preferred embodiment as shown in FIGS. (1) and (3), two gears 17 are integral with the rotary shaft 16 and have tooth-like projections 18 which rotate within the cavity 15 when the shaft 16 is turned. The teeth 18 on the gears 17 engage lengthwise rows of teeth 19 on the arms 12 to move the arms 12 between their minimum length AA and their maximum length BB. In the preferred embodiment, the rows of teeth 19 on an arm pair 11a or 11b are in parallel opposition to each other to allow each gear 17 to simultaneously engage the rows of teeth 19 from both arms 12 in a single arm pair 11a or 11b. Both gears 17 engage the arms 12 when the shaft 16 is turned to move both arm pairs 11a and 11b simultaneously. Both arms 12 in a pair 11a or 11b remain parallel as the cover plates 13a and 13b are rotated and as the arms 12 are moved between their minimum length AA and their maximum length BB.

In the preferred embodiment as shown in FIG. (1), one arm 12 in a pair 11a or 11b has a tightening end 2 shaped to fit around the outside of the wheel 1. The shape of the tightening end 2 takes the form of a "J" in the preferred embodiment, but other shapes are also possible, such as a "C" shape. In addition to having a tightening end 2 shaped to fit around the outside of the wheel 1 the other arm 12 in the pair 11a or 11b has a chalking end 3 shaped to fit between the wheel 1 and the ground. In the preferred embodiment, the chalking end 3 is at an angle with respect to its arm 12 to lay flat on the ground when between the wheel 1 and the ground. Other shapes for the chalking end 3 are also possible, such as a wedge to fit between the wheel and the ground. The tightening end 2 on one arm 12 in the pair 11a or 11b is on the opposite side of axis 20 from the chalking end 3 on the opposite arm 12 in the pair 11a or 11b. The device has four contact points with the wheel 1 provided by the four tightening ends 2 and two contact points with the ground provided by the two chalking ends 3 when the arm pairs 11a and 11b are extended to their angularly disposed position B and tightened to enclose the wheel 1. These contact points are aligned so as to be offset from the vertical centerline 4 of the wheel 1 to eliminate any interference between the device and wheel suspension components to permit the device to be installed on either the front or back wheel.

METHOD OF OPERATION

Before the immobilizing device 10 is placed on the wheel 1 the arm pairs 11a and 11b are in their substantially parallel storage position A and the arms 12 are at their minimum length AA. The arms 12 are then extended to toward their maximum length BB to allow the arms to engage the outside periphery of the wheel 1 by rotating the shaft 16. The immobilizing device 10 is then aligned to the center of the wheel 1 by coaxially orienting axis 20 with the axle of rotation of the wheel 1. The immobilizing device 10 is then rotated about axis 20 to place a chalking end 3 from one arm pair 11a or 11b between the wheel 1 and the ground. The cover plates 13a and 13b are then rotated about axis 20 to place the arm pairs 11a and 11b in their angularly disposed position B allowing the chalking end 3 from the other arm pair 11b or 11a to be placed on the opposite side of the wheel 1.

When the arm pairs 11a and 11b are in their angularly disposed position B a spring-loaded pin type fastener 6 shown in FIG. (1) and preferably located within a hole 14 between the cover plates 13a and 13b as shown in FIG. (4) automatically comes into engagement with both cover plates 13a and 13b to fasten the cover plates 13a and 13b and the arm pairs 11a and 11b in their angularly disposed position B.

At all other times the pin fastener 6 is disengaged to allow the cover plates 13a and 13b to rotate. After the cover plates 13a and 13b and arm pairs 11a and 11b are in their angularly disposed position B the shaft 16 is rotated to withdraw the arms 12 toward their minimum length AA to enclose the wheel 1. When the arms 12 are fully tightened the wheel 1 becomes immobilized as the opposing chalking ends 3 prevent rotation in either direction.

Either before or after the arms 12 are tightened to enclose the wheel 1 a lock 7 can be actuated to simultaneously lock the cover plates 13a and 13b and thus the arms 12. As shown in FIGS. (1) and (4), the lock 7 is preferably recessed within an arc-shaped slot 8 in one cover plate 13a or 13b that spans the angular distance between the storage position A and the angularly disposed position B of the cover plates 13a and 13b and arm pairs 11a and 11b. The slot 8 contains an enlarged area 9 coinciding with the angularly disposed position of the arm pairs B which aligns with the lock 7 when the arm pairs 11a and 11b are in their angularly disposed position B. The alignment of the enlarged area 9 with the lock 7 allows the simultaneous locking of both cover plates 13a and 13b by the lock 7. The lock 7 is of a tumbler design and has a cam which is forced into the enlarged area 9 by the tumbler to simultaneously lock both the cover plates 13a and 13b and the arm pairs 11a and 11b in their angularly disposed position B. The lock 7 preferably contains a shoulder-type retaining device to prevent its removal by a lock hammer as well as a device such as a gusset to alter the exterior shape of the lock to prevent wrench access.

The arms 12 are preferably locked by a ratcheted locking ring 23 mounted around the circumference of the cavity 15 concentric with axis 20. The locking ring 23, shown in FIG. (5), has ratcheted teeth 24 which engage a pawl 25 mounted on the lock 7 as the shaft 16 is turned to withdraw the arms 12 toward their minimum length AA. After the lock 7 is locked the pawl 25 engages the ratcheted teeth 24 of the locking ring 23 to allow the shaft 16 to be turned only in the direction which will tighten the arms 12 around the wheel 1 to prevent the arms 12 from being re-extended after being tightened. The use of this ratcheted design allows tightening of the arms 12 to be accomplished either before or after locking the cover plates 13a and 13b and also allows the arms to be locked at any length between their minimum length AA and their maximum length BB.

What is claimed is:

1. A portable device for immobilizing a wheel, comprising:
   A. a spaced apart substantially circular pair of covers rotatably mounted together wherein:
      (i) said covers rotate about a common axis in opposite directions between a first position and a second position angularly disposed from said first position;
      (ii) said space between said covers defines a housing;
   B. two pairs of arms wherein:
      (i) each said pair comprises a first arm and a second arm positioned parallel to each other;
      (ii) said pairs are positioned within said housing such that a separate pair engages each said cover to rotate with said cover;
      (iii) said pairs are positioned to intersect at said axis to rotate about said axis;
      (iv) each said arm has a first end and a second end wherein:
         (a) said first end of said first arm in each said pair is shaped to engage the periphery of said wheel; and
         (b) said second end of said second arm in each said pair is shaped to engage the periphery of said wheel and to fit between said wheel and the ground to immobilize said wheel;
      (v) said arms in a pair are movable in opposite directions between a first length and a second length wherein:
         (a) the combined span of said pair is at a minimum when said pair is at said first length;
         (b) the combined span of said pair is at a maximum when said pair is at said second length to allow said arms to engage the periphery of said wheel; and
      (vi) a row of teeth is attached lengthwise to each said arm;
   C. a rotary shaft coaxial with said axis and positioned in said housing wherein:
      (i) said shaft includes a pair of gears concentric with said axis to engage said teeth;
      (ii) one said gear simultaneously engages both said rows of teeth in a single pair of said arms; and
      (iii) rotation of said shaft causes said engagement such that both said pairs of arms are simultaneously moved between said first length and said second length;
   D. a fastener for inhibiting rotation of said covers;
   E. a ratchet for tightening said arms on said wheel; and
   F. a lock to simultaneously lock said covers with said arms enclosing said wheel to prevent removal of said device with said wheel immobilized.

2. The device of claim 1 wherein:
   A. said arm pairs are substantially parallel when in said first position; and
   B. said arm pairs are substantially perpendicular when in said second angularly disposed position.

3. A method for attaching the device of claim 1 to a wheel, comprising the following steps:
   A. placing said arms substantially in said first position with both said pairs of arms substantially at said first length;
   B. moving said pairs of arms toward said second length by rotating said shaft;
   C. aligning said device to said wheel by coaxially orienting said axis with the axle of rotation of said wheel;
   D. rotating said arms about said axis to place said second end of a second arm in one said pair between one side of said wheel and the ground;
   E. rotating said arms toward said second angularly disposed position such that said second end of said second arm in the opposite said pair is placed between the opposite side of said wheel and the ground;
   F. engaging said fastener to fasten said covers and said arms at said second angularly disposed position;
   G. locking said lock to lock said covers and said arms in said second angularly disposed position; and
   H. enclosing said wheel by moving said arms toward said first length by rotating said rotary member to prevent removal of said device with said wheel immobilized.

4. A method for attaching the device of claim 2 to a wheel, comprising the following steps:
   A. placing said arms substantially in said first position with both said pairs of arms substantially at said first length;
   B. moving said pairs of arms toward said second length by rotating said shaft;
   C. aligning said device to said wheel by coaxially orienting said axis with the axle of rotation of said wheel;

D. rotating said arms about said axis to place said second end of a second arm in one said pair between one side of said wheel and the ground;

E. rotating said arms toward said second angularly disposed position such that said second end of said second arm in the opposite said pair is placed between the opposite side of said wheel and the ground;

F. engaging said fastener to fasten said covers and said arms at said second angularly disposed position;

G. locking said lock to lock said covers and said arms in said second angularly disposed position; and H. enclosing said wheel by moving said arms toward said first length by rotating said rotary member to prevent removal of said device with said wheel immobilized.

5. The device of claim 1, wherein said ends of said arms shaped to engage the periphery of said wheel are in a "C" configuration.

6. The device of claim 1, wherein said ends of said arms shaped to engage the periphery of said wheel is in a "J" configuration.

7. The device of claim 1, wherein said second ends of said second arms are shaped in a wedge configuration.

8. The device of claim 1, wherein said each said second end of each said second arm is at an angle with respect to said arm such that said second end lies flat on the ground when between said wheel and the ground.

9. The device of claim 1, wherein said shaft is rotated by an externally mounted handle.

10. The device of claim 1, wherein said shaft is rotated by a screwdriver.

11. The device of claim 1, wherein said lock includes a device to alter the exterior shape of said lock to prevent access to the interior of said lock.

12. The device of claim 1, wherein said lock includes an exterior retainer to prevent removal of said lock.

13. The device of claim 1, wherein one of said covers includes an arc-shaped slot concentric with said axis wherein:

A. said slot spans the angular distance between said first position and said second angularly disposed position; and B. said slot contains an enlarged area coincident with said second angularly disposed position.

14. The device of claim 13, wherein said lock includes a cam to lock said covers and said arms when said cam is aligned with said enlarged area.

15. The device of claim 1, wherein said fastener comprises a spring-loaded pin communicating with both said covers and movable from a disengaged position to an engaged position wherein:

A. when in said disengaged position said fastener permits said rotation of said covers and said arms; and B. when in said engaged position said fastener simultaneously fastens said covers and said arms.

16. The device of claim 1, wherein said ratchet comprises:

A. a ring mounted between said covers with an inner circumference lined by angled teeth; and B. a pawl actuated by said lock between a disengaged position and an engaged position in contact with said angled teeth such that when engaged said pawl limits rotation of said shaft to a direction which moves said arms toward said first length.

* * * * *